United States Patent
Moratz

(10) Patent No.: US 9,574,608 B2
(45) Date of Patent: Feb. 21, 2017

(54) BEARING CAGE WITH RIGID INSERTS BETWEEN POCKETS

(71) Applicant: Schaeffler Technologies AG & Co. KG, Herzogenaurach (DE)

(72) Inventor: William Moratz, Gardiner, NY (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/709,811

(22) Filed: May 12, 2015

(65) Prior Publication Data
US 2016/0333933 A1 Nov. 17, 2016

(51) Int. Cl.
*F16C 33/38* (2006.01)
*F16C 33/46* (2006.01)

(52) U.S. Cl.
CPC ....... *F16C 33/4694* (2013.01); *F16C 33/4676* (2013.01)

(58) Field of Classification Search
CPC .............. F16C 33/3862; F16C 33/3868; F16C 33/3875; F16C 33/3881; F16C 33/4641; F16C 33/4647; F16C 33/4652; F16C 33/4664; F16C 33/38; F16C 33/46; F16C 33/467; F16C 33/4676; F16C 33/4694
See application file for complete search history.

(56) References Cited

U.S. PATENT DOCUMENTS

| | | | | |
|---|---|---|---|---|
| 1,013,151 A * | 1/1912 | Foster | ............... | F16C 19/20 384/526 |
| 1,045,193 A * | 11/1912 | Sachs | ................ | F16C 33/3862 384/530 |
| 1,266,145 A * | 5/1918 | Newmann | ............. | F16C 33/38 384/530 |
| 1,691,015 A * | 11/1928 | Leister | ................ | F16C 33/3868 29/898.1 |
| 2,017,772 A * | 10/1935 | Schildgen | ............. | F16C 19/184 264/249 |
| 2,018,701 A * | 10/1935 | Bott | .................... | F16C 33/3862 29/898.067 |
| 2,742,332 A * | 4/1956 | Cobb | .................... | F16C 19/52 184/107 |
| 2,747,945 A * | 5/1956 | Fulton | ................ | F16C 33/3862 384/467 |
| 2,779,640 A * | 1/1957 | Jones, Jr. | ........... | F16C 33/6655 384/480 |
| 2,861,849 A * | 11/1958 | Case | ................... | F16C 33/3875 29/453 |

(Continued)

FOREIGN PATENT DOCUMENTS

DE 10218238 A1 * 11/2003 .......... F16C 33/3868

OTHER PUBLICATIONS

The Barden Corporation—"BARDEN Precision Cages" (8 pgs.); relevant portion at p. 6, "Type: ZA"; Apr. 1, 2000.

*Primary Examiner* — Alan B Waits
(74) *Attorney, Agent, or Firm* — Volpe and Koenig, P.C.

(57) ABSTRACT

A cage for a rolling bearing formed from two axial halves and a rolling bearing cage assembly including a cage formed from two axial halves, include passages formed through the web separating adjacent rolling element pockets when the two halves are in an abutting relationship. A rigid element is inserted in at least one passage with radial ends extending into the adjacent rolling element pockets.

15 Claims, 3 Drawing Sheets

(56) References Cited

U.S. PATENT DOCUMENTS

| | | | | | |
|---|---|---|---|---|---|
| 2,923,582 | A | * | 2/1960 | Dunn | F16C 19/10 384/623 |
| 2,975,008 | A | * | 3/1961 | Ruley | F16C 33/3862 384/530 |
| 2,977,161 | A | * | 3/1961 | Cobb | F16C 33/3862 384/466 |
| 3,006,447 | A | * | 10/1961 | Irwin | F16C 19/55 192/45.1 |
| 3,087,762 | A | * | 4/1963 | Gothberg | F16C 19/26 384/578 |
| 3,361,499 | A | * | 1/1968 | Kearns | F16C 33/3868 384/523 |
| 3,471,208 | A | * | 10/1969 | Vannest | F16C 33/3868 384/530 |
| 5,388,918 | A | * | 2/1995 | Williams | F16C 33/3862 384/523 |
| 5,630,669 | A | * | 5/1997 | Stewart | F16C 19/26 384/570 |
| 8,888,375 | B2 | * | 11/2014 | Brock | F16C 33/3831 384/527 |
| 9,121,450 | B2 | * | 9/2015 | Lee | F16C 33/3862 |
| 9,169,871 | B2 | * | 10/2015 | Fujimi | F16C 33/3875 |
| 2009/0003749 | A1 | * | 1/2009 | Bridges | F16C 33/3862 384/531 |

* cited by examiner

BEARING CAGE WITH RIGID INSERTS BETWEEN POCKETS

FIELD OF INVENTION

The invention relates to the field of rolling bearings, and more specifically to a rolling bearing cage with rigid inserts between adjacent rolling bearing pockets.

BACKGROUND

Bearing cages are known to maintain spacing between rolling elements in a bearing. The bearing cages include pockets for receiving a rolling element for free movement constrained by the walls forming the perimeter of the pocket. One wall forming the perimeter of the pocket can be a circumferential edge of the web between adjacent pockets.

In some applications, contact between the rolling element and the circumferential edge of the web influences the response of the rolling element to torque in unpredictable ways that are unacceptable in certain applications.

Some current bearing cages have attempted to address the rolling element contact with the edge of the web by placing an insert, or spacer, for example a compression spring, roller, or other component between adjacent rolling elements instead of a web. However, in some known systems, the position of the spacer varies with respect to the rolling elements and influences the response of the rolling element to torque. Known spacer systems are also limited in operating speed due limited stability between the spacer and the rolling elements.

Accordingly, a need exists for a rolling bearing cage with an insert that overcomes the drawbacks of the current cages.

SUMMARY

A rolling bearing cage and a rolling bearing cage arrangement are provided herein. In some embodiments, the rolling bearing cage comprises a first ring element formed with axially extending webs arranged in a circumferential direction. Adjacent webs are separated by a first gap. A first groove is formed in an axial face of each of the webs. A second ring element formed with axially extending webs arranged in a circumferential direction with adjacent webs separated by a second gap. A second groove is formed in an axial face of each of the webs. Rolling element pockets are formed from the first and second gaps by placing the axial faces of the webs of the first ring element in an abutting relationship with the axial faces of the webs of the second ring element so that, when the axial faces are abutting, each of the first grooves align with an axially opposed second groove to form a passage between adjacent pockets. A rigid element is disposed within at least some of the passages.

In some embodiments, a rolling bearing cage arrangement comprises a cage with a first ring element formed with axially extending webs arranged in a circumferential direction. Adjacent webs are separated by a first gap. A first groove is formed in an axial face of each of the webs. A second ring element is formed with axially extending webs arranged in a circumferential direction with adjacent webs separated by a second gap. A second groove is formed in an axial face of each of the webs. Rolling element pockets are formed from the first and second gaps by placing the axial faces of the webs of the first ring element in an abutting relationship with the axial faces of the webs of the second ring element so that, when the axial faces are abutting, each of the first grooves align with an axially opposed second groove to form a passage between adjacent pockets. A rigid element is disposed within at least one of the passages. Rolling elements are disposed in at least some of the rolling element pockets, wherein the rigid element is adapted to contact a rolling element and maintain the rolling element spaced from a circumferential face of the web.

Other and further embodiments of the present invention are described below.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

Figure 1A:
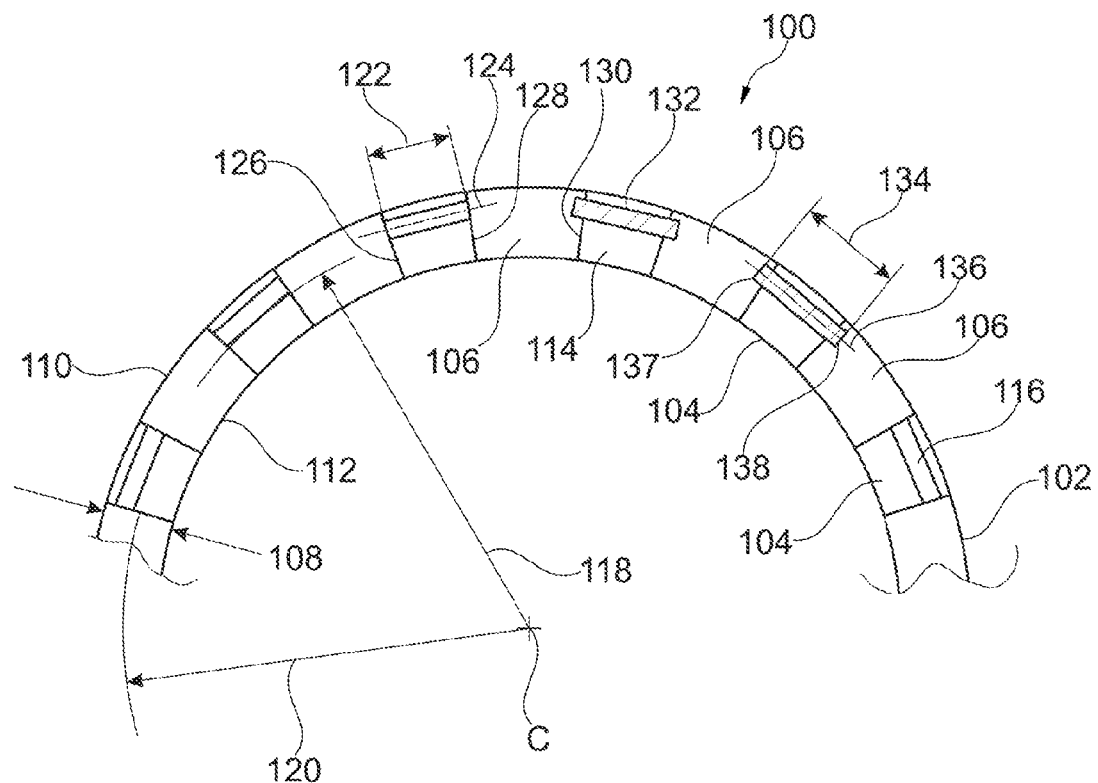
FIG. 1A is an axial view of a portion of one axial half of a cage for a rolling bearing in accordance with an embodiment.

To facilitate understanding, identical reference numerals have been used, where possible, to designate identical elements that are common in the figures. The figures are not drawn to scale and may be simplified for clarity. It is contemplated that elements and features of one embodiment may be beneficially incorporated in other embodiments without further recitation.

While described in reference to a rolling bearing, the present invention may be modified for a variety of applications while remaining within the spirit and scope of the claimed invention, since the range of the potential applications is great, and because it is intended that the present invention be adaptable to many such variations.

DETAILED DESCRIPTION

Certain terminology is used in the following description for convenience only and is not limiting. The words "front," "rear," "upper" and "lower" designate directions in the drawings to which reference is made. The words "radially inwardly" and "radially outwardly" refer to directions radially toward and away from an axis of the part being referenced. "Axially" refers to a direction along the axis of a shaft or other part. If dimensions or structures are referred to as being the same, it is assumed that the dimensions or structures are within a reasonable manufacturing tolerance of each other. "Rigid" as used in this disclosure means resistant to deflection or buckling under anticipated loads experienced in normal operation, as distinguished from "resilient" which means, among other things, springing back after compressing. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

FIG. 1A is an axial view of a portion of one axial half of a cage 100 for a rolling bearing in accordance with an embodiment of the disclosure. The rolling element cage 100 comprises a ring element 102 formed with axially extending webs 104 (6 shown) circumferentially disposed around the ring element 102. Each web 104 has an axial face 114 and a radial thickness 108 between the inner 112 and outer 110 radii of the ring element 102.

A groove 116, for example a linear groove, is formed in the axial face 114 of each web 104, with the groove 116 formed tangential to a circle with a radius 118 having a center C common with the ring element 102. In a preferred embodiment, the length of radius 118 corresponds with, or is greater than, the radius 120 of the mid-plane of the web 104. Accordingly, in a preferred embodiment, the groove 116 is radially outward of the mid-plane of the web's radial thickness. The groove 116 has a length 122 measured at the longitudinal axis 124 between circumferential faces 126, 128 of the web 104. In a preferred embodiment, the length 122 of each groove 116 is the same.

A gap 106 (5 fully shown) is formed between circumferential faces (for example 128, 130) of adjacent webs 104 and axially bounded by an axial face of the ring element 102.

Figure 1B:
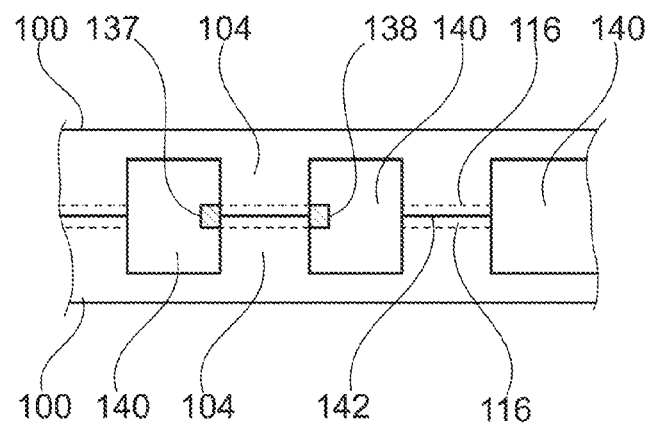
FIG. 1B is a radial view of a portion of a cage for a rolling bearing in accordance with an embodiment

A second axial half of a rolling element cage 100, similar to ring element 102 is provided with the same web 104, groove 116, and gap 106 arrangement and dimensions. As illustrated in FIG. 1B, when the two axial halves are combined so that the axial faces 114 of one ring element 100 are abutting with the axial faces 114 of the other ring element 100, the combined gaps 106 of the thus disposed ring elements align and form rolling element pockets 140 (2 fully shown in FIG. 1B).

When the axial faces 114 of the two halves are abutting, grooves 116 of one ring element 100 align with the grooves 116 of the other ring element 100 forming passages 142 between adjacent rolling element pockets 140. In an embodiment, one or more abutting axial faces 114 of the opposing halves may be joined together, for example by welding.

A rigid element 132 is disposed in the passage 142 (shown in FIG. 1A for clarity). The rigid element may be an elongate element, for example a rod or tube, of any cross section and formed from any suitable material such as metal or plastic. The rigid element 132 may have a plug or a cap at each end 137, 138. The ends of the rigid element, with or without a plug or cap, may be contoured, for example at least one of the ends 137, 138 may have a surface configured to correspond with a spherical or cylindrical surface. The rigid element 132 has a length 134 at the longitudinal axis 136. In a preferred embodiment, length 134 is greater than the length 122 of the groove 116 (and also passage 142) as illustrated in FIG. 1A so that the ends 137, 138 extend at least partially into the adjacent rolling element pockets 140. The passage 142 supports the rigid element 132 for at least one of rotational displacement about the longitudinal axis 136 or axial displacement in the direction of the longitudinal axis 136.

In a preferred embodiment, the passage 142 is generally circular in cross section and the rigid element 132 is cylindrical in cross section and formed from a material recognized as having low friction characteristics, for example from polytetrafluoroethylene or a material containing polytetrafluoroethylene.

Alternately, at least the ends 137, 138 of the rigid element 132 may be coated or impregnated with a material or materials that can reduce the influence of contact between the rigid element 132 and the rolling element 202 (described with reference to FIG. 2, below) on the torque response of the rolling element. The coating may include oil or other lubricants present in the operating environment.

Figure 2:
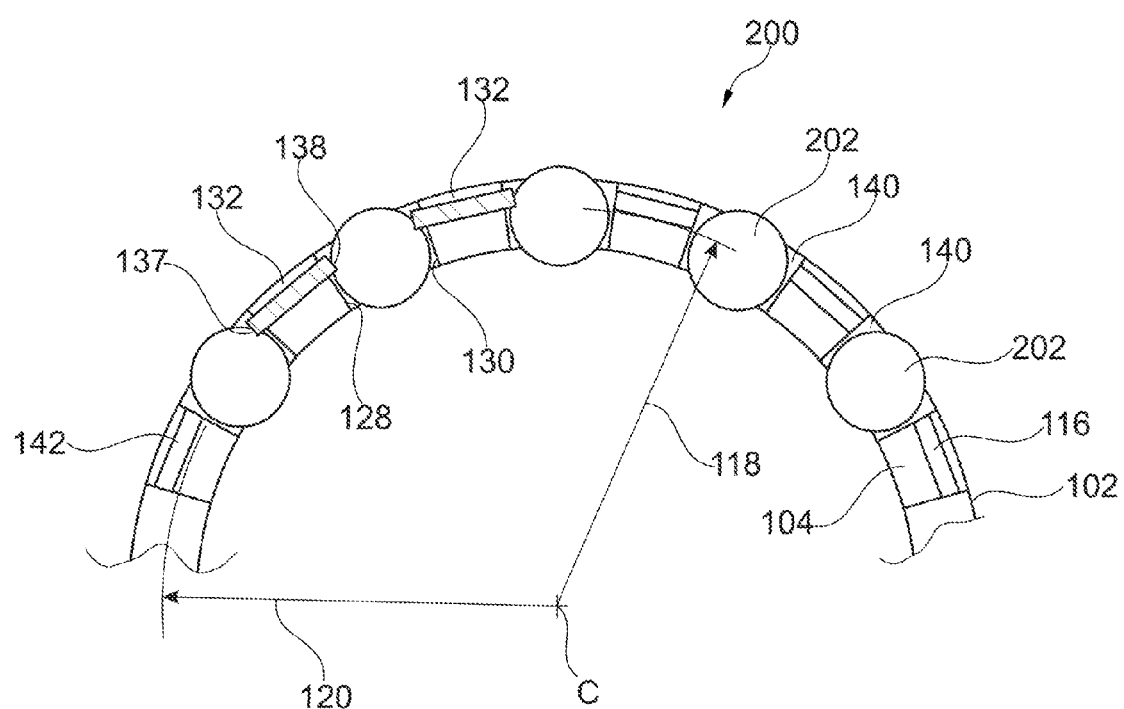
FIG. 2 is an axial view of a portion of a rolling element cage arrangement in accordance with an embodiment.

FIG. 2 is an axial view of a portion of one axial half of a rolling bearing cage arrangement 200 in accordance with an embodiment of the disclosure. FIG. 2 shares many features of FIGS. 1A and 1B. For brevity, some of the shared features will not be further described. The rolling bearing cage 200 comprises two ring elements 102 with the axial faces 114 of radially opposing webs 104 in an abutting relationship as discussed above with respect to cage 100. For clarity in FIG. 2, only one ring element 102 of the rolling bearing cage arrangement 200 is shown.

As illustrated in FIG. 2, rolling elements 202 are disposed in at least some of the rolling element pockets 140. The rolling elements 202 may, for example, be spherical or cylindrical in shape and formed from any suitable rolling element material, for example stainless steel or other bearing grade steel.

Rigid elements 132 (2 shown in FIG. 2) are disposed in some of the passages 142 formed in the web 106 between adjacent rolling element pockets 140. In a preferred embodiment, the ends 137, 138 of the rigid elements 132 extend at least partially into the adjacent rolling element pockets 140 and are adapted to contact the rolling elements 202. By contacting the rolling elements 202, the rigid elements 132 can maintain the rolling element 202 spaced apart from the circumferential faces (for example 128, 130) that bound the rolling element pockets 140. The ends 137, 138 may be contoured as above to facilitate spacing the rolling elements 202 from the circumferential faces and to decrease the influence of contact between the rolling element 202 and the rigid element 132 on the torque response of the rolling element 202.

Figure 3A:
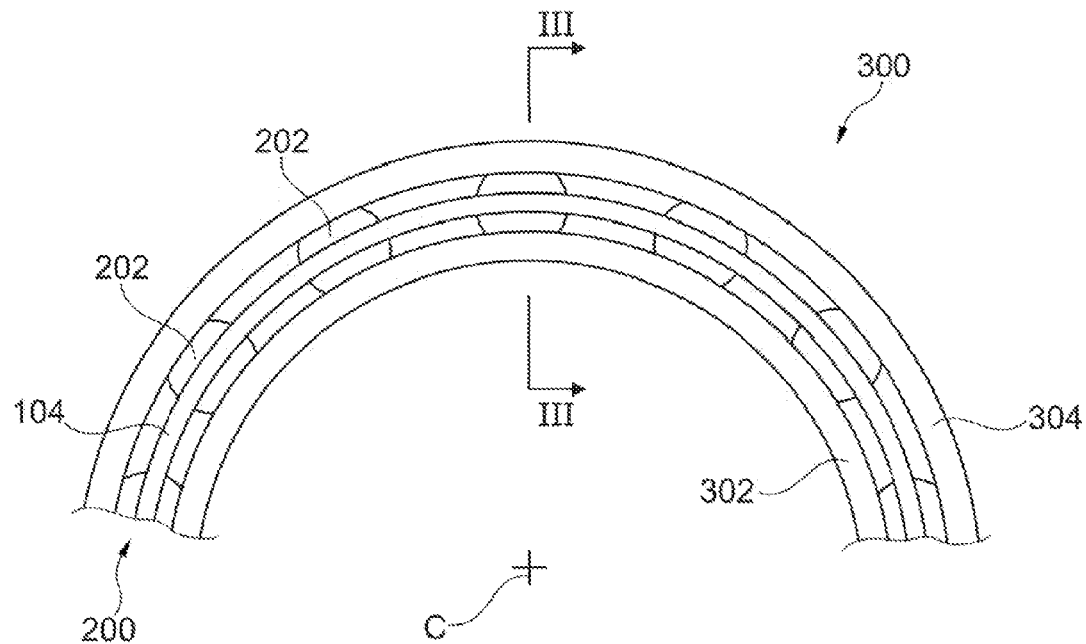
FIG. 3A is an axial view of a bearing assembly in accordance with an embodiment.
Figure 3B:
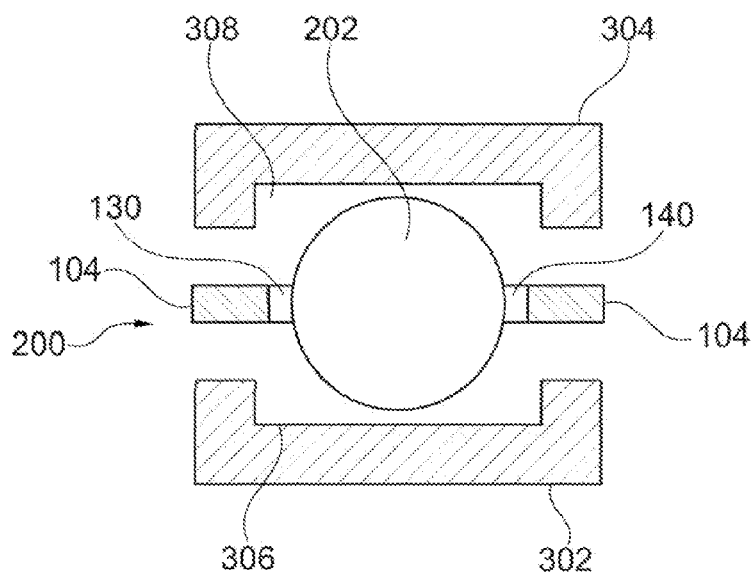
FIG. 3B is a cross-section view of the bearing assembly of FIG. 3A along line III-III.

In a non-limiting embodiment illustrated in FIGS. 3A and 3B, the rolling bearing cage arrangement 200 is incorporated in a rolling bearing assembly 300 further comprising an inner ring 302, and outer ring 304. Rolling elements 202 are in rolling contact with at least one of the radially outward facing raceway surface 306 of inner ring 302 or the radially inwardly facing raceway surface 308 of outer ring 304. The inner ring 302 and outer ring 304 radially position the rolling elements 202 with the radially outwardly facing raceway surface 306 providing a radially inner boundary and the radially inwardly facing raceway surface 308 providing a radially outer boundary for rolling element positioning. The rolling elements are disposed in rolling element pockets 140 formed from radially opposed webs 104. Rigid elements 132 (FIG. 2) maintain a space between the circumferential face 130 and the rolling element 202. Thus a rolling bearing cage having a rigid insert, a rolling bearing cage arrangement, and a rolling bearing assembly comprising the rolling bearing cage assembly are provided herein. The cage, cage arrangement, and assembly may advantageously eliminate, or substantially reduce, the contact between the rolling element and the circumferential edges of the web and provide guidance and stability to the rigid element and the rolling elements. Accordingly, the response of the rolling element to torque may be enhanced. Additionally, higher operating speed may be achieved with such cage arrangements over known systems.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A cage for a rolling bearing, the cage comprising:
a first ring element formed with axially extending webs arranged in a circumferential direction with adjacent webs separated by a first gap and a first groove formed in an axial face of the webs;
a second ring element formed with axially extending webs arranged in a circumferential direction with adjacent webs separated by a second gap and a second groove formed in an axial face of each of the webs;
rolling element pockets formed from the first and second gaps by placing the axial faces of the webs of the first ring element in an abutting relationship with the axial faces of the webs of the second ring element,
wherein, when the axial faces are abutting, each of the first grooves align with each of the second grooves to form a circumferentially extending passage between adjacent pockets for receiving a rigid element disposed within at least one of the passages.

2. The cage of claim 1, wherein a circumferential length of the rigid element is greater than a circumferential length of the passage.

3. The cage of claim 1, wherein the rigid element is supported in the passage for preventing at least one of axial and angular displacement.

4. The cage of claim 1, wherein the rigid element is an elongate member.

5. The cage of claim 4, wherein the rigid element is a cylindrical rod or tube.

6. The cage of claim 1, wherein the passages are radially outward of a mid-plane of a web radial thickness.

7. The cage of claim 1, wherein each of the first grooves and the second grooves are linear and each linear groove is tangent to a circle concentric with the first ring element.

8. A rolling bearing cage arrangement comprising:
a cage comprising:
a first ring element formed with axially extending webs arranged in a circumferential direction with adjacent webs separated by a first gap and a first groove formed in an axial face of each of the webs;
a second ring element formed with axially extending webs arranged in a circumferential direction with adjacent webs separated by a second gap and a second groove formed in an axial face of each of the webs;
rolling element pockets formed from the first and second gaps by placing the axial faces of the webs of the first ring element in an abutting relationship with the axial faces of the webs of the second ring element;
passages between adjacent pockets formed from axially aligned opposed first and second grooves when the axial faces are abutting with a rigid element disposed within at least one of the passages and extending into each of the adjacent rolling element pockets; and
rolling elements disposed in at least some of the rolling element pockets, wherein the rigid element is adapted to contact a rolling element and maintain the rolling element spaced from a circumferential face of the web.

9. The arrangement of claim 8, wherein a circumferential length of the rigid element is greater than a circumferential length of the passage.

10. The arrangement of claim 8, wherein the rigid element is supported in the passage for at least one of axial and angular displacement.

11. The arrangement of claim 8, wherein the rigid element is an elongate element.

12. The arrangement of claim 11, wherein the rigid element is a cylindrical rod or tube.

13. The arrangement of claim 8, wherein the passages are radially outward of a mid-plane of a web radial thickness.

14. The arrangement of claim 8, wherein the first groove and the second groove are linear and each linear groove is tangent to a circle concentric with the first ring element.

15. A rolling bearing assembly comprising:
a cage comprising:
a first ring element formed with axially extending webs arranged in a circumferential direction with adjacent webs separated by a first gap and a first groove formed in an axial face of each of the webs;
a second ring element formed with axially extending webs arranged in a circumferential direction with adjacent webs separated by a second gap and a second groove formed in an axial face of each of the webs;
rolling element pockets formed from the first and second gaps by placing the axial faces of the webs of the first ring element in an abutting relationship with the axial faces of the webs of the second ring element;
passages between adjacent pockets formed from axially aligned opposed first and second grooves when the axial faces are abutting with a rigid element disposed within at least one of the passages and extending into each of the adjacent rolling element pockets;
rolling elements disposed in at least some of the rolling element pockets, wherein the rigid element is adapted to contact a rolling element and maintain the rolling element spaced from a circumferential face of the web;
an inner ring disposed radially inwardly from the rolling elements having a radially outwardly facing raceway surface; and
an outer ring disposed radially outwardly from the rolling elements having a radially inwardly facing raceway surface.

* * * * *